(12) United States Patent
Runk et al.

(10) Patent No.: US 7,806,472 B2
(45) Date of Patent: Oct. 5, 2010

(54) HEAD SUPPORT AND SEAT PAD ASSEMBLY FOR A CHILD SEAT

(75) Inventors: Kelly Runk, Pequea, PA (US); Sharon L. Griffiths, Reading, PA (US)

(73) Assignee: Graco Children's Products Inc., Exton, PA (US)

( * ) Notice: Subject to any disclaimer, the term of this patent is extended or adjusted under 35 U.S.C. 154(b) by 124 days.

(21) Appl. No.: 12/333,055

(22) Filed: Dec. 11, 2008

(65) Prior Publication Data

US 2010/0148543 A1 Jun. 17, 2010

(51) Int. Cl.
*A47C 31/00* (2006.01)

(52) U.S. Cl. .................. 297/219.12; 297/220; 297/223; 297/397; 297/283.1; 297/283.4; 297/484.7; 297/410

(58) Field of Classification Search ............ 297/219.12, 297/220, 223, 283.4, 283.2, 284.1, 284.7, 297/284.9, 397, 404, 410, 61

See application file for complete search history.

(56) References Cited

U.S. PATENT DOCUMENTS

| | | | | |
|---|---|---|---|---|
| 1,007,985 A | * | 11/1911 | Smith | 297/284.7 |
| 2,652,183 A | * | 9/1953 | Hlivka | 297/229 |
| 3,992,057 A | * | 11/1976 | Studebaker | 297/467 |
| 4,274,673 A | * | 6/1981 | Kifferstein | 297/220 |
| 4,362,334 A | * | 12/1982 | Ross et al. | 297/230.12 |
| 4,402,548 A | * | 9/1983 | Mason | 297/464 |
| 4,627,587 A | * | 12/1986 | McCutchan et al. | 244/122 R |
| 5,056,533 A | * | 10/1991 | Solano | 5/627 |
| 5,064,245 A | * | 11/1991 | Stephens | 297/397 |
| 5,161,522 A | * | 11/1992 | Clevenger | 601/24 |
| 5,332,292 A | * | 7/1994 | Price et al. | 297/488 |
| 5,367,730 A | * | 11/1994 | Sher | 5/655 |
| D389,359 S | * | 1/1998 | Nowak | D6/601 |
| 5,988,744 A | * | 11/1999 | Franchak | 297/256.17 |
| 6,164,721 A | * | 12/2000 | Latshaw et al. | 297/256.17 |
| 6,296,307 B1 | * | 10/2001 | Holtke | 297/219.12 |
| D458,503 S | * | 6/2002 | Norman | D6/611 |
| 6,644,747 B2 | * | 11/2003 | Jones | 297/399 |
| 6,929,325 B1 | * | 8/2005 | Goelo | 297/219.1 |
| D523,679 S | * | 6/2006 | Illingworth | D6/601 |
| 7,222,917 B2 | * | 5/2007 | Ward | 297/223 |
| 7,234,771 B2 | * | 6/2007 | Nakhla | 297/250.1 |
| 7,614,098 B1 | * | 11/2009 | Quarry | 5/111 |
| 7,641,283 B2 | * | 1/2010 | Rumack | 297/219.12 |
| 7,677,661 B1 | * | 3/2010 | Ferrari-Cicero et al. | 297/219.12 |

* cited by examiner

*Primary Examiner*—Laurie K Cranmer
(74) *Attorney, Agent, or Firm*—Lempia Braidwood LLC

(57) ABSTRACT

A seat pad assembly is disclosed including a body pad for placement on the seating surface of a child seating device. The body pad has a front side, a back side, and two spaced apart vertical slots through the pad. The seat pad assembly has a head support with a connecting strip extending between a pair of laterally spaced apart cushions. The head support is generally H-shaped and installed on the pad through the slots with the pair of cushions on one side of the pad and the connecting strip on the other side. The head support is slidable along the slots to adjust the vertical position of the cushions. The seat pad assembly can be used on a child seating device such as a children's car seat, an infant carrier, a stroller, an infant swing, or the like.

24 Claims, 7 Drawing Sheets

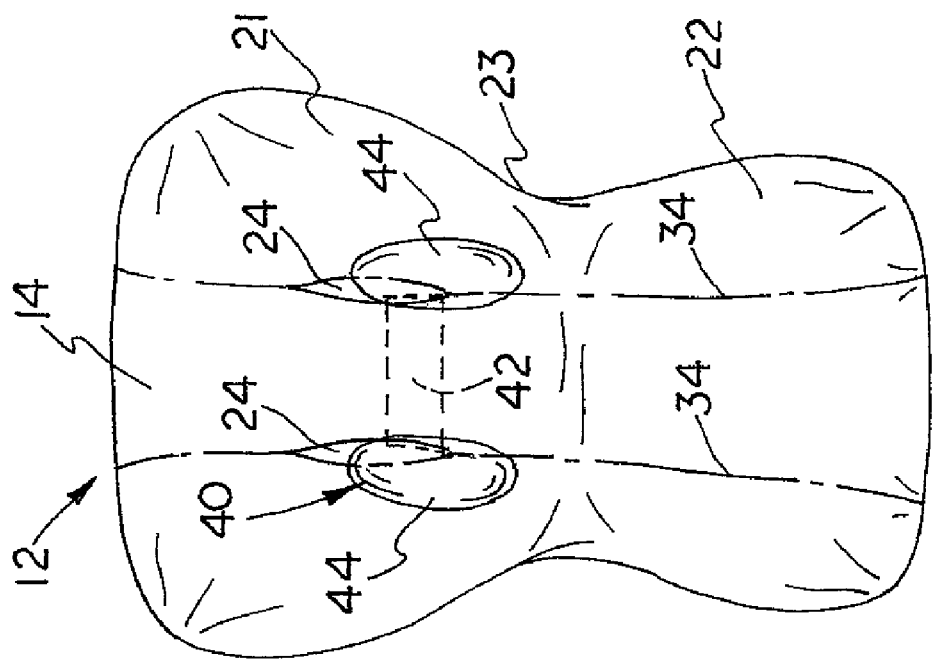
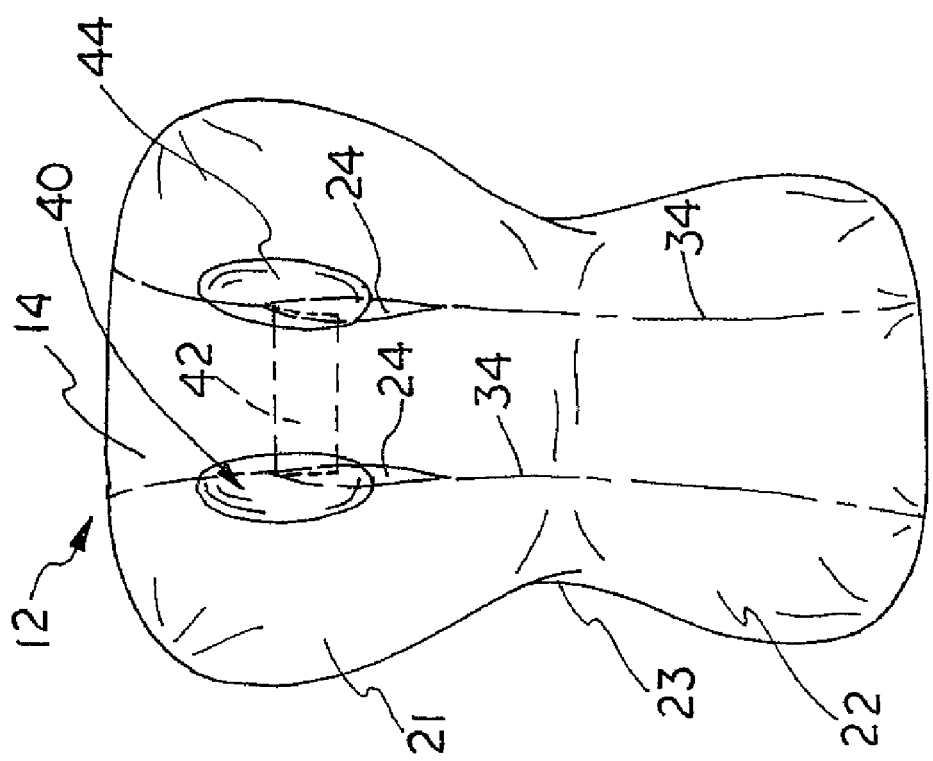

HEAD SUPPORT AND SEAT PAD ASSEMBLY FOR A CHILD SEAT

BACKGROUND OF THE INVENTION

1. Field of the Disclosure

The present disclosure is generally directed to child or infant seats, and more particularly to a head support for an infant's or child's head when used with such seats.

2. Description of Related Art

It is generally acknowledged that an infant's head should be supported until the infant develops the physical capability to support his or her own head. Supporting an infant's head not only aids in the comfort of the child, but can also help to avoid injury. Older children also can benefit from use of a head support. Many car seats, strollers, and other infant seats offer some capability of supporting an infant's head. Some infant seating devices are configured to accommodate differently sized infants and children. Adjustability is often accomplished by moving the hard goods to change the seating angle or recline angle, by manually relocating the belts of a child restraint system, or by raising or lowering a head rest section of the hard goods. Some seats have a belt positioning or locating feature provided as part of the hard goods.

Other child head supports are known in the art that are designed as a soft goods item and which can be used in various infant seats. One known support in particular is a tubular pillow sewn directly to a pad. A central portion of the tubular pillow does not adjust relative to the overall length of the pad or in relation to an upper end of the pad. Only the ends of the tubular pillow adjust outwardly. Often the position of the entire support must be altered to accommodate different sized children so adjustability is limited. Some head supports are designed for use only with infants and others for use only with toddlers, for example.

SUMMARY OF THE INVENTION

A seat pad assembly is disclosed and described herein and has a body pad and a head support. The body pad in one example has a pad or cushion with two spaced apart, elongate, co-lateral, vertically oriented slots or openings. The pad has a contoured shape to fit on the seating surface of a car seat, a stroller seat, an infant carrier, a swing seat, or other child seating device. The head support in one example is H-shaped and has a central connecting strap or strip with two ends. Each end is connected to a generally ellipsoid shaped cushion. Each cushion of the head support can be threaded through a vertical slot of the body pad from a back side to a front side of the pad. When assembled, the connecting strip remains at the back side of the pad. The head support is adjustable vertically along the co-lateral slots in order to accommodate infants and children of various heights. Friction and/or surface interference between the pad and support can keep the head support from sliding out of position while in use on a seating device. The body pad can include additional horizontal slots or openings located as necessary to accommodate various three- and five-point restraint harness systems of various infant seats available in the marketplace.

In one embodiment, the seat pad assembly can be reversible so that either a front side or a back side of both the body pad and the head support can be used. The two sides of the body pad and/or the head support can be made of different textile fabrics or fabrics having different or contrasting prints, patterns, textures, or solids colors. When reversed, the cushions of the head support may be threaded through the vertical slots of the body pad from the front side to the back side with the connecting strip remaining on the front side. In such an example, up to four different fabric looks can be achieved using the same seat pad assembly.

In one embodiment, the seat pad assembly can have a body pad and a head support and be adapted for a child's car seat for use in a vehicle. In another embodiment, the seat pad assembly can have a body pad and a head support and be adapted for a stroller. In other examples, the seat pad assembly can be configured for use on an infant carrier, a swing seat, or other child motion or seating devices.

In one embodiment, the body pad and the head support can be an accessory pad assembly or an add-on cushion for an infant seating device or the like already having a primary seat pad. In such a case, the accessory pad assembly may allow additional adjustability by increasing the size range of children that the child seat can accommodate. Further, the pad assembly disclosed herein can be manufactured in a range of sizes to accommodate a greater size range of infants and children, from a relatively large toddler to a relatively small premature infant, and/or for use with a variety of seating devices available on the market.

The seat pad assemblies disclosed herein may be made from many different types of fabric, polyester fleece, or any suitable material combination. The body pad and head support can also be filled with resilient foam, polyester filler, batting, or the like, or a combination thereof.

BRIEF DESCRIPTION OF THE DRAWINGS

Objects, features, and advantages of the present invention will become apparent upon reading the following description in conjunction with the drawing figures, in which:

FIG. 9 shows one adjustment position for the alternate head support in FIG. 6 on a body pad.

FIG. 10 shows another adjustment position for the alternate head support in FIG. 6 on a body pad.

DETAILED DESCRIPTION OF THE DISCLOSURE

The present invention is for a head support and seat pad assembly for use with a child or infant seating device, such as a car seat, a stroller, an infant carrier, a swing, or the like. A seat pad assembly in one example has a body pad and an adjustable head support arranged so that the head support is positioned at the sides of an infant's head. The head support can engage the shoulders and cradle the head of an infant when the infant is placed in the seating device on the seat pad assembly. The head support thereby can prevent or inhibit discomfort or side movement of the head and neck of the infant. The disclosed head support is particularly useful for sleeping children or infants who are not yet able to support their own heads.

Figure 1:
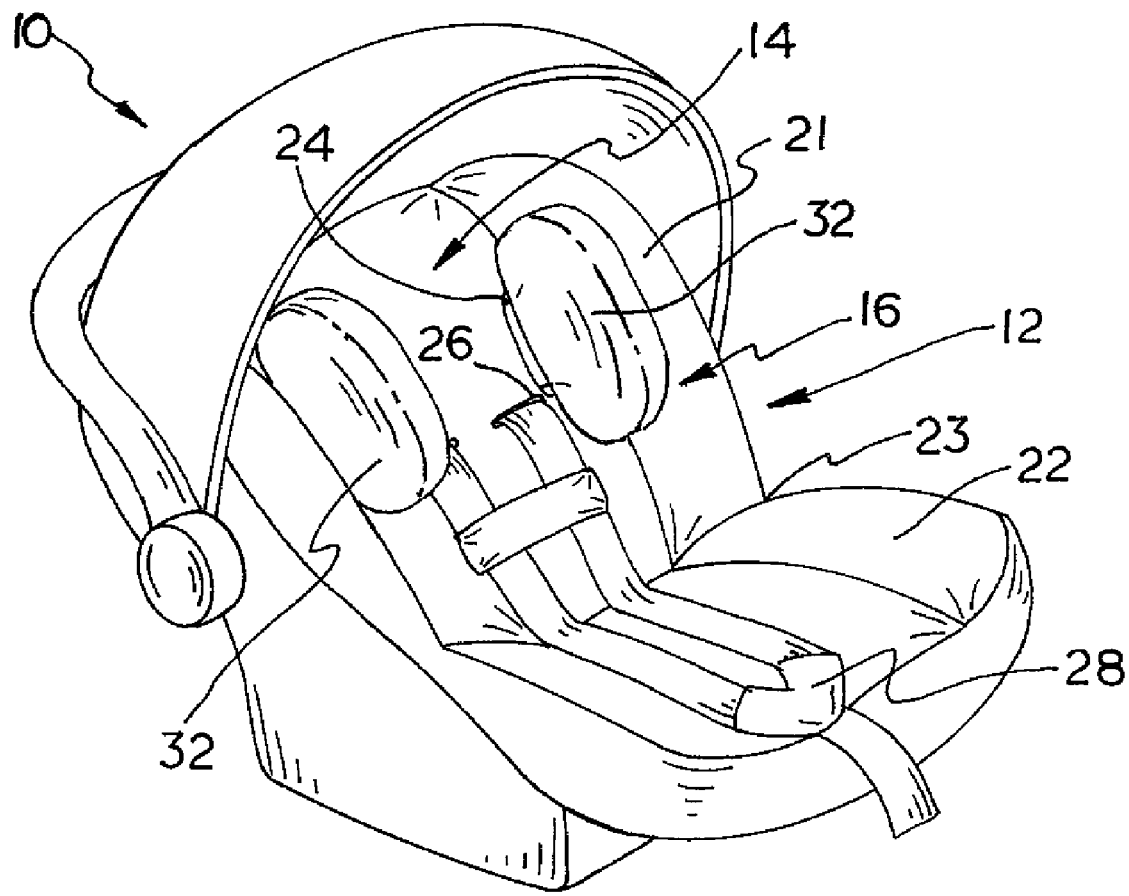
FIG. 1 shows a perspective view of one example of an infant car seat or infant carrier with a seat pad assembly having a body pad and head support according to the teachings of the present invention.
Figure 2:
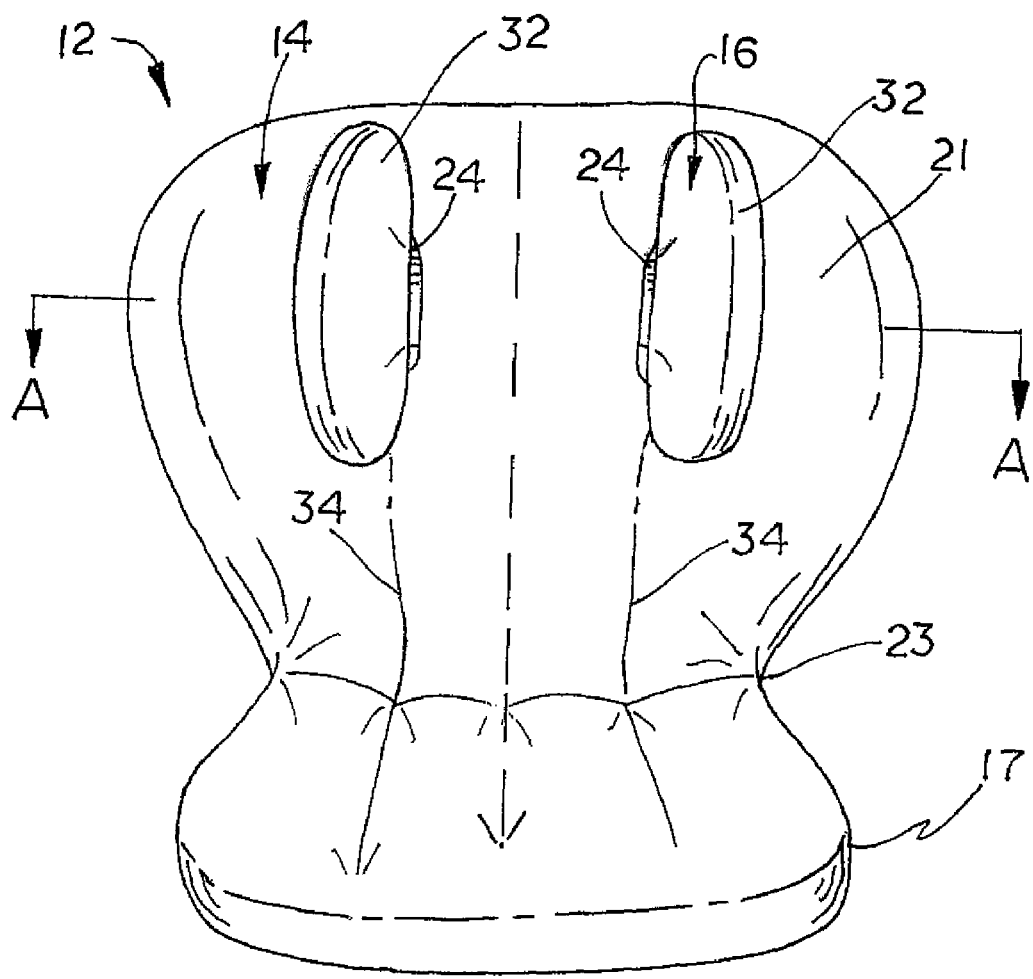
FIG. 2 shows a front view of the body pad and head support in FIG. 1 removed from the seat or carrier.

Turning now to the drawings, FIG. 1 shows an infant carrier or car seat 10 with a children's seat pad assembly 12 disposed on a seating surface of the car seat. In FIG. 2, the seat pad assembly 12 is shown apart from the seat 10. The seat pad assembly 12 includes a body pad 14 and an adjustable head support 16 in accordance with the teachings of the present invention.

Figure 3:
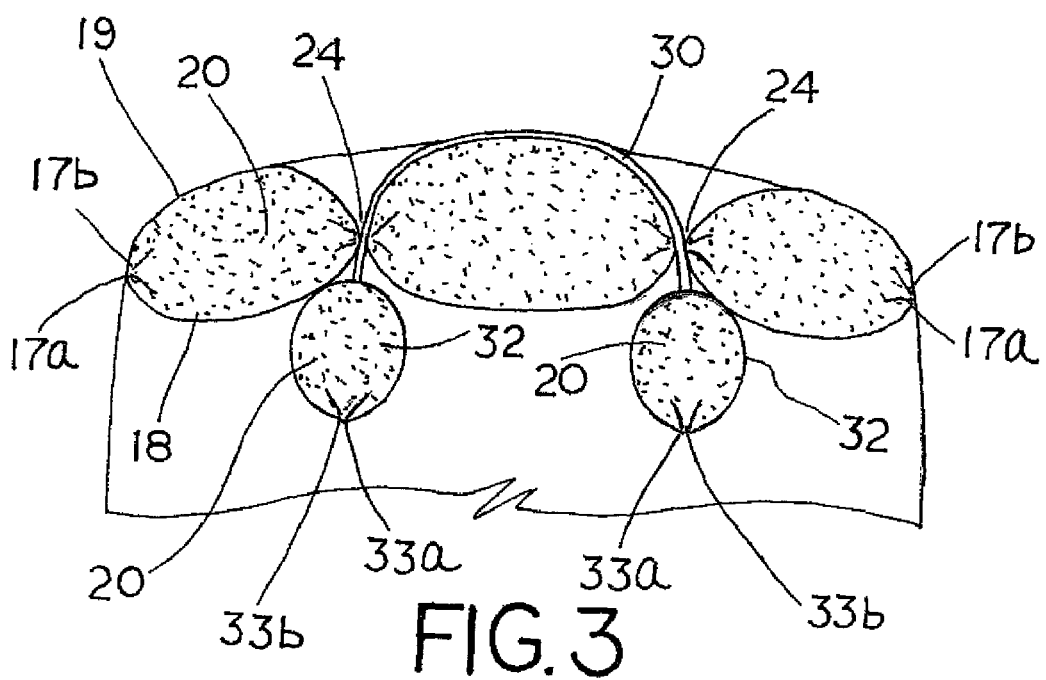
FIG. 3 shows a cross-section along line A-A of FIG. 2 of the body pad and head support.

FIG. 3 shows a cross section along line A-A of FIG. 2, through the pad 14 and the head support 16. The body pad 14 can be formed of two main pieces of fabric sewn together along mating perimeter edges 17a, 17b. One fabric piece can define the front side 18, and one piece can define the back side 19 of the pad. The assembled body pad 14 is a contoured cushion that can be filled with a padding or filler 20. As shown in FIG. 2, the body pad 14 can have an upper shoulder portion 21 that can cradle the head and shoulders of an infant or child. The pad 14 also has a lower bottom portion 22 that can support the hips and legs of the infant or child. The pad 14 also has a narrowed tapered region 23, like a waist, at the seat bight that allows the pad to bend and conform easily to an infant seating device without excess bulk at the seat bight.

In general, a portion of the body pad 14, specifically the bottom portion 22, which conforms to a seat base portion of the seating surface of a car seat or stroller, is often narrower than the shoulder portion 21 that overlays a seat back portion of a car seat or stroller. The actual shape of the pad 14 can be varied, depending on the seat configuration of the infant seating device. For example, the upper portion 21 can be wider or narrower to fit various seating devices. Moreover, the pad 14 or any portions thereof may be thicker, thinner, longer, or shorter to adapt to particular applications.

The body pad 14 in this example also includes two elongate, generally vertical slots 24 that are spaced apart or co-lateral and are located in the upper shoulder portion 21. As can be seen in FIG. 1, the body pad 14 can also include optional horizontal or other slots 26 at various locations configured to accommodate the belts of a restraint harness system 28 of the particular car seat or other infant seating device which the pad is installed. In FIG. 1, the assembly 12 is shown installed in a car seat 10. Harness belts of the car seat's restraint harness 28 can be pulled through the horizontal slots 26 of the body pad 14. This can allow the infant to be secured in the seating device in a normal manner.

Figure 4:
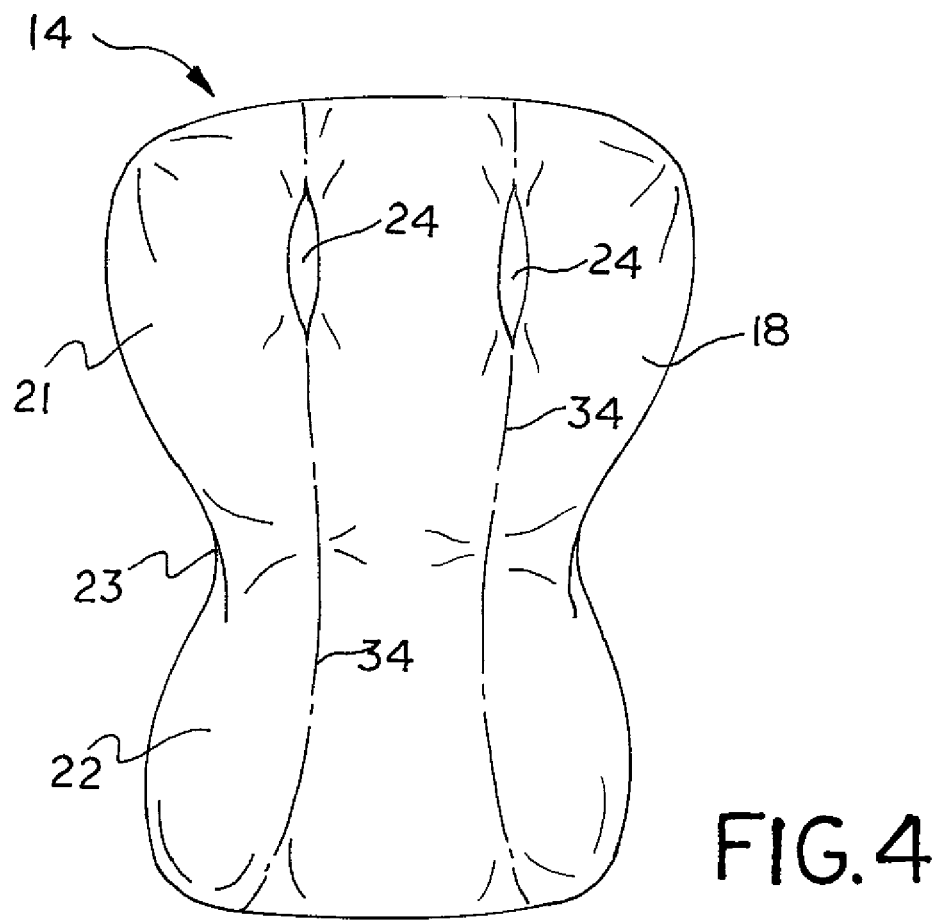
FIG. 4 shows a front view of the body pad in FIG. 2.

As shown in FIG. 3, when assembled the adjustable head support 16 is inserted in the slots 24 of the pad 14. FIG. 4 shows the pad 14 alone with no head support 16. In this example, the vertical slots 24 are located along spaced apart vertical seams 34 in the shoulder portion 21 of the pad 14 between adjacent tufted sections of the pad. The seams 34 are placed to allow the body pad 14 to curve and conform along a vertical (shoulder portion) or horizontal (bottom or leg portion) reference to the contours of a child seat 10 or other seating device.

Figures 5, 6:
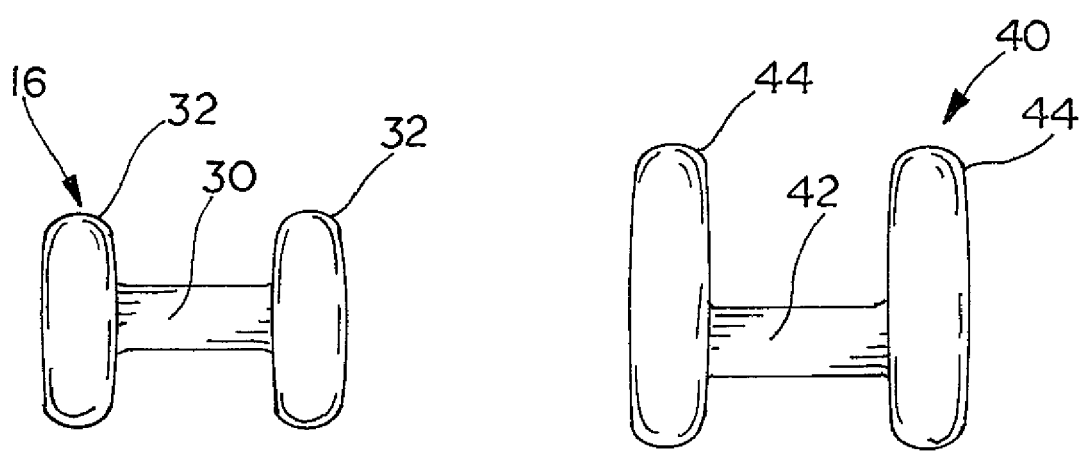
FIG. 5 shows a plan view of one example of a head support according to the teachings of the present invention.
FIG. 6 shows a plan view of another embodiment of a head support according to the teachings of the present invention.

FIG. 5 shows one example of the adjustable head support 16 separate from the pad 14. The head support 16 in this example is configured in an H-shape. The head support 16 includes a center connecting strip 30, which in one example can be made of the same fabric material as the pad 14. The connecting strip 30 has two ends. An elongate cushion 32 is attached to each respective end of the connecting strip 30. In the embodiment of FIG. 5, the connecting strip 30 of the head support is attached to each respective cushion 32 at about a midpoint relative to a length of each cushion. Each cushion 32 can be similar to the body pad 14 in materials and general structure. Each individual cushion can be formed of two pieces of fabric sewn together along mating perimeter edges 33a, 33b with one piece defining the front side 36 and one piece defining the back side 37 of the respective cushion. Each cushion 32 on a respective end of strip 30 is a mirror image of the other in this example. The assembled cushions 32 can also be filled with a padding or filler 20. The padding or filler in the cushions 32 can be of the same type and density as the pad 14 or can be of a different density to achieve a desired head supporting characteristic. The connecting strip 30 has no filler in this example and can be formed of one or more thicknesses of fabric, webbing, or the like.

FIG. 6 illustrates another example of a head support 40. In this alternate example, the support 40 has a connecting strip 42 with two ends. Each end has a respective cushion 44 attached thereto. The connecting strip 42 in this example is offset above or below a center of each respective cushion 44, which results in the cushions 44 being longer on one side of the strip 42 than the other.

To assemble the seat pad assembly 12 as shown in FIGS. 2 and 3, each respective cushion 32 is inserted endwise through a respective slot 24 in the pad 14 from the back side to the front side, if the front side is to be facing outward when in use. The strip 30 remains on the back side of the pad 14 and helps to retain the cushions 32 in a desired position. The ellipsoid cushions 32 are pliable enough for ease of insertion, yet firm enough to stay where placed once inserted.

In one embodiment, the body pad 14 is reversible. In that case, the head support 16 can be installed in a reverse direction if the back side 37 is to be facing outward when the assembly 12 is in use. When the assembly is reversed, the cushions 32 can be threaded through the slots 24 in the pad 14 from the front side 36 to the back side 37. The connecting strip 30 then remains on the front side 36. When reversible, the two sides of the pad 14 and/or the head support 16 can be made of different textile fabrics or fabrics having different or contrasting prints, patterns, textures, or solids colors. In one example, up to four different fabric looks can be achieved using the same seat pad assembly. In another example, one fabric on one side of the pad 14 and/or the head support 16 may be a thermal insulating fabric suitable for cold weather, such as a flannel or a fleece. The other side of the pad 14 and/or the head support 16 may be a moisture wicking and/or breathable fabric suitable for warm weather, such as a wicking fabric or a polyester mesh fabric.

Each of the vertical slots 24 is longer than the connecting strip 30 is wide. The additional length of the slots 24 allows the head support 16 to be adjusted up or down along the slots 24 by sliding the connecting strip 30 along the slots 24. Positioning the head support 16 relatively higher along the slots 24 accommodates relatively taller infants or children. Positioning the head support 16 relatively lower along the slots 24 accommodates relatively smaller infants. The connecting strip 30 has a length at least as long as the distance between the co-lateral slots including the thickness of the body pad, but not much longer. This will allow the cushions 32 to be inserted and yet be held snuggly in place with the assistance of tension in the connecting strap 30. When the pad assembly 12 is installed on an infant seating device, friction can also help to keep the head support 16 from sliding from the desired or selected position. Nonetheless, an optional retention means, such as a hook and loop fastener, can be disposed on the surface of the body pad 14 between the elongate slots 24 and on the strip 30.

Figure 7:
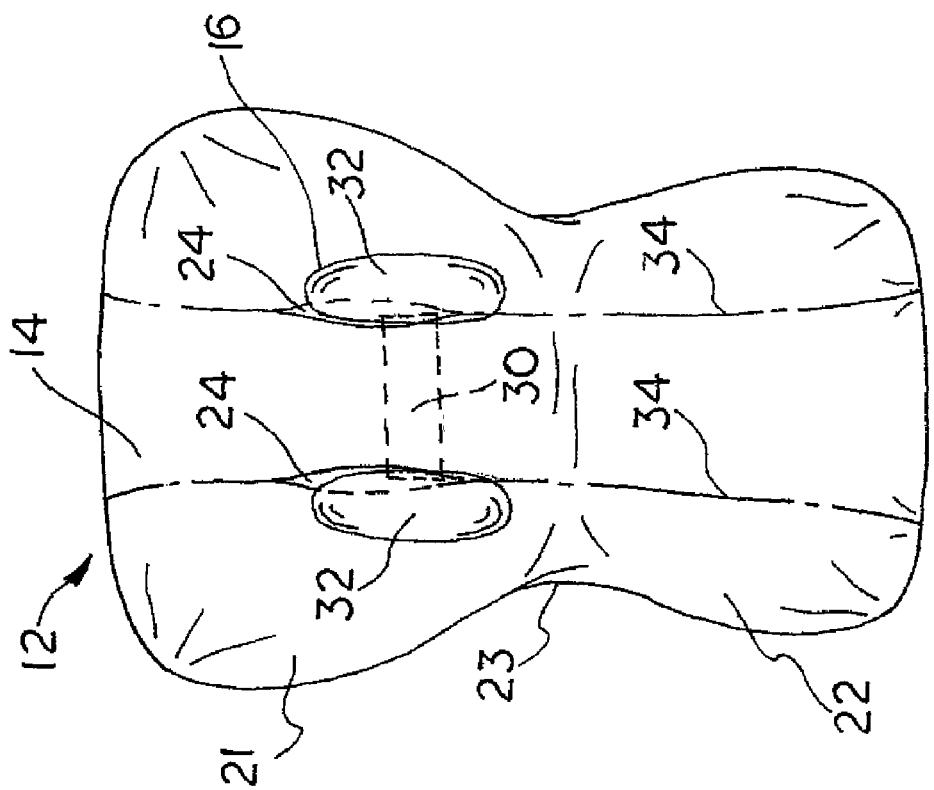
FIG. 7 shows one adjustment position for the head support in FIG. 5 on a body pad.
Figure 8:
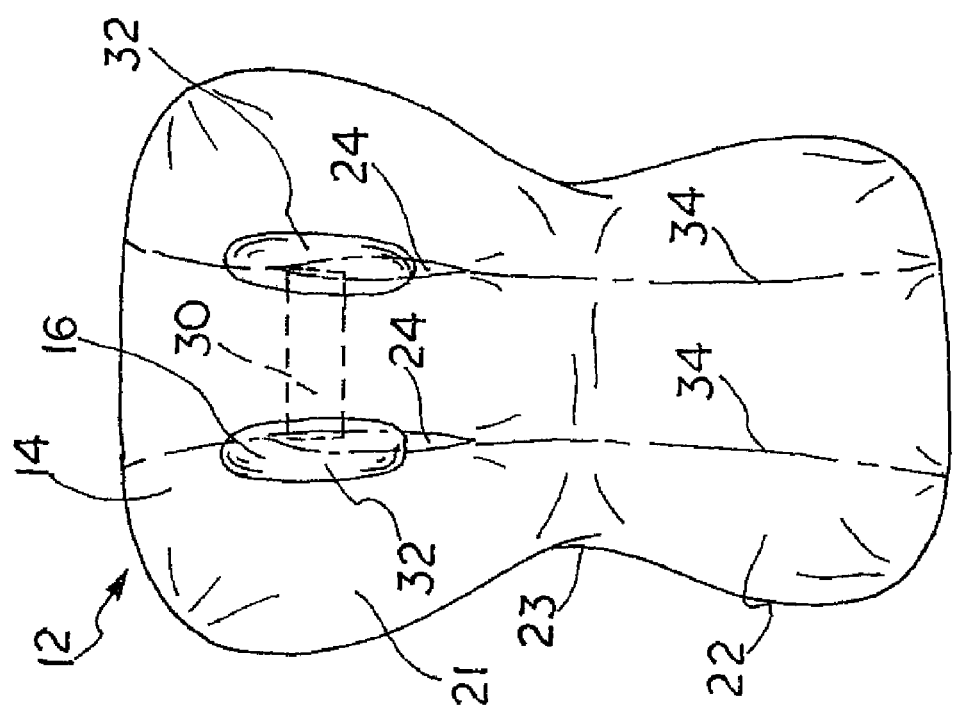
FIG. 8 shows another adjustment position for the head support in FIG. 5 on a body pad.

FIGS. 7 and 8 show the range of adjustability of the head support 16. FIG. 7 shows the head support 16 positioned to its highest position relative to the slots 24 in the pad 14. An edge of the connecting strip 30 is in contact with the upper end of the slots 24. When the head support 16 is in the highest position, the seat pad assembly can accommodate larger children or infants for which the seating device 10 is suited. In FIG. 8, the head support 16 is shown positioned at its lowest position relative to the slots 24 of the pad 14. An edge of the connecting strip 30 is in contact with the lower end of the slots 24. The position shown accommodates smaller children or infants. The head support 16 can also be adjusted to any position between the highest and the lowest positions shown in FIGS. 7 and 8.

As shown in FIGS. 9 and 10, the offset connecting strip 42 of the head support 40 allows an even greater range of adjustability than the head support 16. The head support 40 can be flipped one way or the other and threaded through the slots with the long end of each cushion up or down as desired. Positioning the head support 40 relatively higher along the slots 24 with the longest portion of the cushions 44 oriented upward accommodates relatively taller children. Positioning the head support 40 at the lowest position along the slots 24 with the longest portion of the cushions 44 oriented downward accommodates relatively smaller infants.

Figure 11:
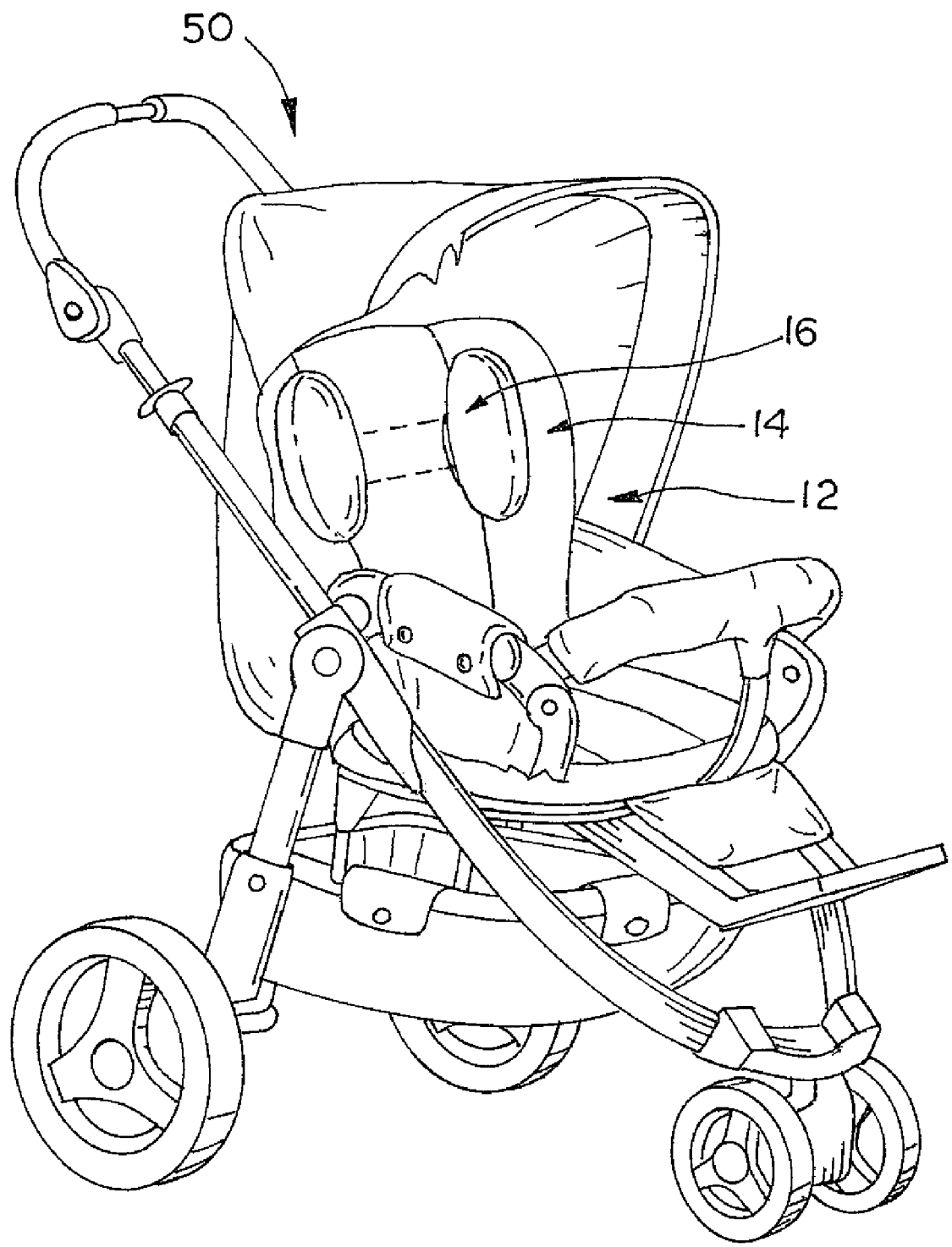
FIG. 11 shows a perspective cut-away view of a stroller with the body pad and head support of FIG. 2 installed.
Figure 12:
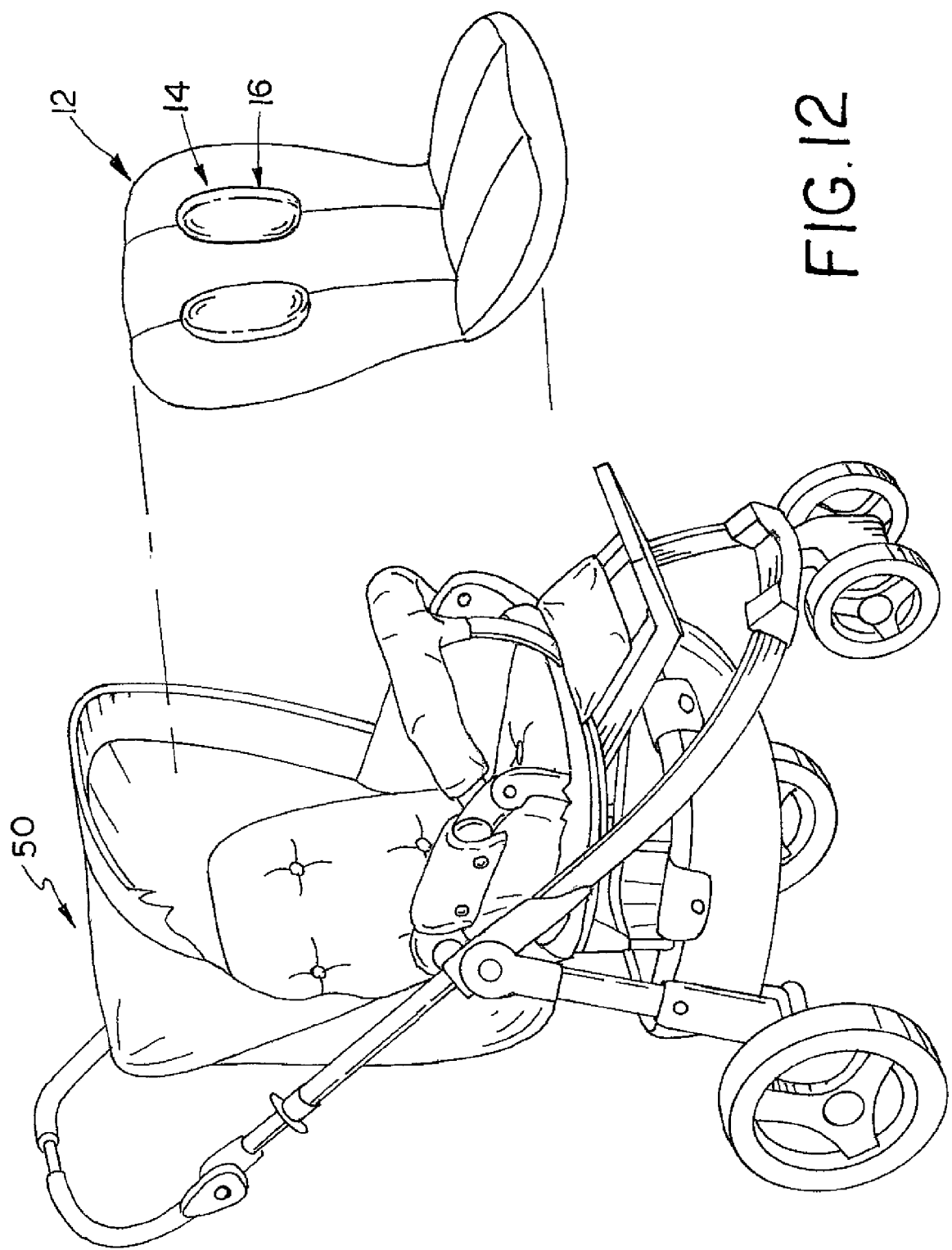
FIG. 12 shows a perspective cut-away view of the stroller in FIG. 11 with the body pad and head support removed.

As noted above, the type of child seating device for which the pad assembly 12 is intended can vary. As illustrated by FIG. 11, the child seating device can be a stroller 50 with the seat pad assembly 12 installed. FIG. 12 shows the stroller 50 after removal of the seat pad assembly 12, which can allow a user to reconfigure the stroller seat, or other seating device, once a child has outgrown the use of the seat pad assembly.

In another example according to the teachings of the present invention, the seat pad assembly 12 can be provided separately as an accessory for use on child seating devices already in the marketplace. Thus the seat pad assembly need not be sold with a particular seating device. As an accessory, the seat pad assembly 12 allows various infant seating devices to be customized by the user. The optional horizontal harness holes 26 as shown in FIG. 1 can be configured to allow such customization.

The body pad 14 of the assembly 12 in one example is made of a fabric material that is appropriate and comfortable for an infant or child, and has a suitable filler material or stuffing. The cushions 32 can be formed of the same or a complimentary fabric to that of the body pad 14. The cushions 32 can be filled with the same or different type of padding filler material as the pad 14.

Although certain infant seating devices and seat pad assemblies have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A child seat comprising:
    a seating surface;
    a body pad on the seating surface, the pad having a front side, a back side, and two slots through the body pad, the slots spaced apart and generally vertically oriented; and
    a head support having a connecting strip extending between a pair of cushions, the pair of cushions being laterally spaced apart,
    wherein the head support is installed on the pad through the slots such that the pair of cushions are on one of the front or the back side of the pad and the connecting strip is on the other of the front or the back side.

2. A child seat according to claim 1, wherein the head support is slidable along the slots to adjust the vertical position of the cushions.

3. A child seat according to claim 1, wherein the head support is H-shaped and the connecting strip is centered relative to a vertical length of each of the pair of cushions.

4. A child seat according to claim 1, wherein the connecting strip is offset from a vertical center of each of the pair of cushions, and wherein the head support can be selectively slid along the slots on the pad between a high position and a low position.

5. A child seat according to claim 1, wherein each of the pair of cushions is an ellipsoid shape.

6. A child seat according to claim 1, wherein the body pad has additional through-slots configured to receive a restraint harness of the child seat.

7. A child seat according to claim 1, wherein the body pad is reversible, having one pad fabric on the front side and a second different pad fabric on the back side, and wherein the head support is reversible, having a first side and a second side and having one cushion fabric on the first side and a second different cushion fabric on the second side, and wherein the head support is configured so that the pair of cushions can also be selectively positioned on either the first side or the second side of the body pad when installed.

8. A child seat according to claim 1, wherein the child seat is a children's car seat.

9. A child seat according to claim 1, wherein the child seat is an infant carrier.

10. A child seat according to claim 1, wherein the child seat is a stroller seat.

11. A stroller comprising:
    a seat having a seat back and a seat bottom;
    a body pad on the seat having a front, a back, and two slots that are co-laterally spaced apart through the pad and generally vertically oriented; and
    a head support having a connecting strip with two ends and a cushion on each of the two ends,
    wherein the head support is installed on the pad through the slots such that the pair of cushions are on one of the front or the back side of the pad and the connecting strip is on the other of the front or the back side.

12. A stroller according to claim 11, wherein the head support is slidable along the slots to adjust the vertical position of the head support.

13. A stroller according to claim 11, wherein the head support is H-shaped and the connecting strip is centered relative to a length of the pair of cushions.

14. A stroller according to claim 11, wherein the body pad has additional through-slots located to accommodate a restraint harness of the stroller seat.

15. A seat pad assembly for a child seating device comprising:
    a pad sized to rest on a seating surface of the child seating device, the pad having a front side, a back side, and a pair of slots through the pad that are spaced apart and generally vertically oriented slots; and
    a head support having a connecting strip extending between and interconnecting a pair of cushions, the pair of cushions being laterally spaced apart,
    wherein each of the pair of cushions is capable of being passed through a respective one of the slots of the pad such that the pair of cushions are adjacent one of the front or the back side and the connecting strip is on the other of the front or the back side of the pad.

16. A stroller according to claim 15, wherein the head support can be positionally and slidably adjusted along the slots.

17. A stroller according to claim 15, wherein the connecting strip and the fabric panel of the pad each have a portion of a hook and loop fastener to secure the head support in a selected vertical position.

18. A seat pad assembly according to claim 15, wherein the connecting strip and a surface of the pad each have a portion of a fastener to removably secure the head support in a selected position along the slots.

19. A seat pad assembly according to claim 15, wherein the connecting strip is connected to and extends between a mid-section of each of the pair of cushions.

20. A seat pad assembly according to claim 15, wherein the connecting strip is offset from a vertical center of each of the pair of cushions, and wherein the head support can be selectively slid along the slots on the pad between a high position and a low position.

21. A seat pad assembly according to claim 15, wherein the front side and the back side of the pad each have a fabric layer with a different textile pattern, and the pad is reversible on the child seating device.

22. A seat pad assembly according to claim 15, wherein the head support has two sides and is reversible so that the pair of cushions can be positioned on either the front side or the back side of the pad with either of the two sides facing the pad.

23. A seat pad assembly according to claim 15, wherein the pad has additional through-slots located so as to accommodate a belt of a restraint system of the child seating device.

24. A seat pad assembly according to claim 15, wherein the front side and the back side of the pad and two sides of the head support each have a different fabric layer, and one side is a thermal insulating fabric suitable for cold weather, and the other side is a moisture wicking fabric suitable for warm weather, and wherein the pad is reversible on the child seating device, and wherein the head support is configured so that the pair of cushions can also be selectively positioned on either the front side or the back side of the pad when installed.

* * * * *